Figure 1:
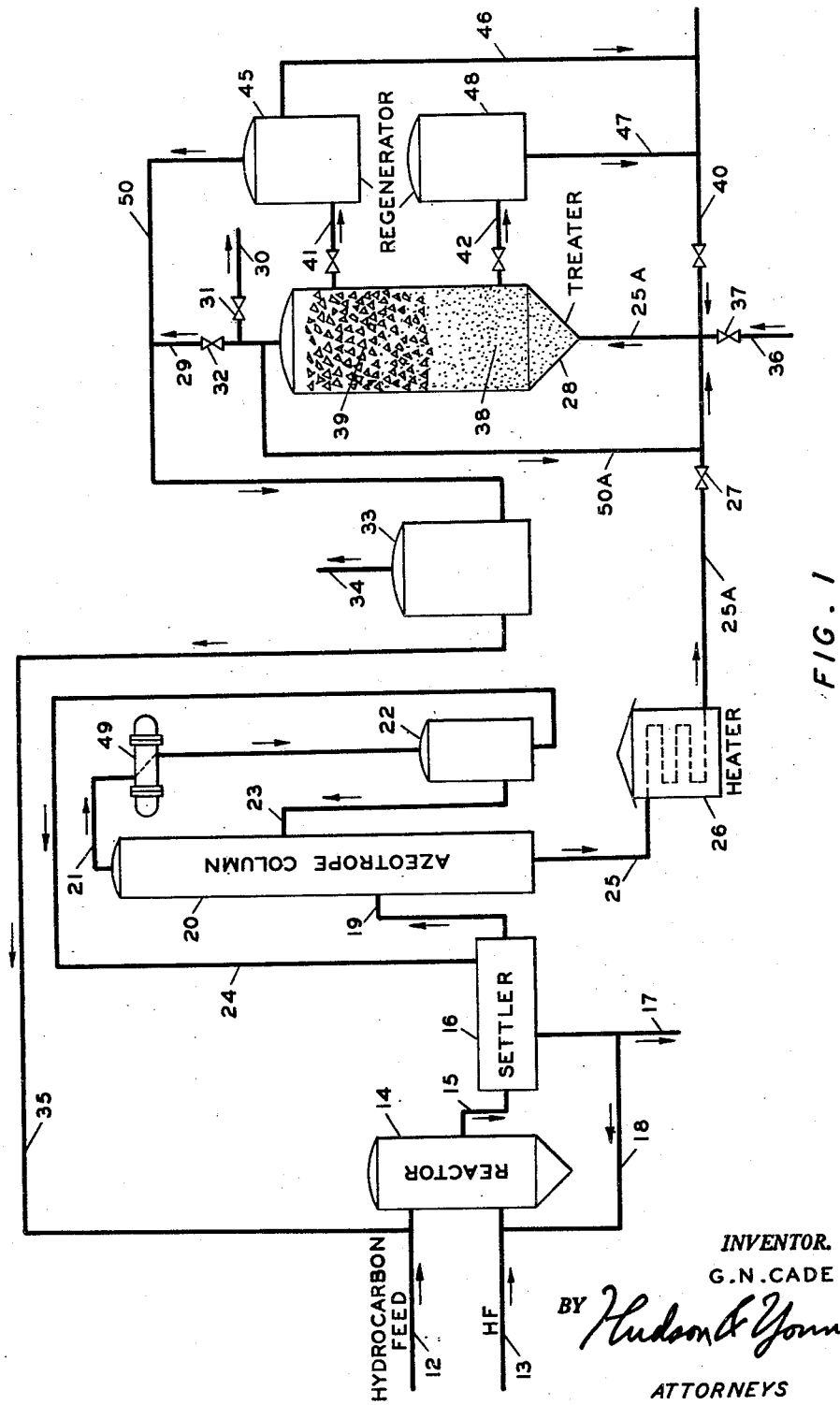

Oct. 23, 1951  G. N. CADE  2,572,595
DEHYDROFLUORINATION PROCESS
Filed Dec. 18, 1947  2 SHEETS—SHEET 1

INVENTOR.
G. N. CADE
BY Hudson & Young
ATTORNEYS

Oct. 23, 1951   G. N. CADE   2,572,595
DEHYDROFLUORINATION PROCESS
Filed Dec. 18, 1947   2 SHEETS—SHEET 2

INVENTOR.
G. N. CADE
BY Hudson & Young
ATTORNEYS

Patented Oct. 23, 1951

2,572,595

UNITED STATES PATENT OFFICE 2,572,595

DEHYDROFLUORINATION PROCESS

George N. Cade, Bartlesville, Okla., assignor to Phillips Petroleum Company, a corporation of Delaware Application December 18, 1947, Serial No. 792,592

10 Claims. (Cl. 260—676)

This invention relates to the treatment of hydrocarbons. In one of its more specific aspects, it relates to the treatment of hydrocarbon materials containing organically combined fluorine for the removal and recovery of said halogen. In a still more specific aspect, it relates to a process for the removal and recovery of organically combined fluorine from products of alkylation or isomerization wherein a fluoride has been used as a catalyst.

The presence of small amounts of organically combined fluorine in hydrocarbon products of alkylation, of isomerization, and of other reactions promoted by halide catalysts and the undesirability of these fluorine compounds in the hydrocarbon products are known in the art. In certain processes, such as HF alkylation, the removal of organic fluorine from the products is particularly important. In the past, the fluorine has been removed by one of several methods: (1) thermal decomposition, (2) treatment with granular porous oxides, such as bauxite, and (3) treatment with metals or mixtures of metals. The first type is disadvantageous in that it may be accompanied by corrosion of equipment and, in some cases, undesired reactions of the hydrocarbons. The second, although effective, is disadvantageous in that recovery of the removed fluorine in useful form is difficult and in that some naturally occurring oxides contain siliceous impurities that are converted to undesired silicon tetrafluoride. The third method comprises contacting the hydrocarbon products with metal catalysts that effect the splitting of hydrogen fluoride from the organic halogen compounds; the hydrogen fluoride split off may be subsequently recovered as such and reused as the catalyst or component thereof. This latter method has the further advantage that HF-producing reaction is not accompanied by silicon tetrafluoride formation.

One limitation in the use of metals or mixtures of metals as catalysts for hydrogen fluoride recovery is that the metal catalysts have heretofore been used in the form of rather coarse metals, and, of course, in such condition they have a small surface area per unit weight. Furthermore, these catalysts have heretofore been used only in static, fixed-bed operation, in which the hydrocarbon treated contacts only a relatively small part of the catalyst. As a result, contact of the hydrocarbons with the catalyst is somewhat limited, and comparatively low space velocities are necessary for obtaining the desired extent of dehydrofluorination.

One object of my invention is to provide a method for the effective removal of organically combined fluorine from hydrocarbon materials containing such products.

Another object of my invention is to provide a method for the effective removal of organically combined fluorine from hydrocarbon materials containing such products and for the recovery of such removed fluorine.

Another object of my invention is to provide a process for increasing the effectiveness of the contacting of the organic fluorine-containing hydrocarbon material with the reagent to expedite removal of the fluorine.

Still another object of my invention is to provide a continuous process for such fluorine removal and recovery.

Still other objects and advantages will be apparent upon reading the following disclosure, which taken with the attached drawing, respectively described and illustrates preferred form of my invention.

Figure 1 of the drawing represents diagrammatically one form of apparatus in which one embodiment of my invention may be carried out.

Figure 2:
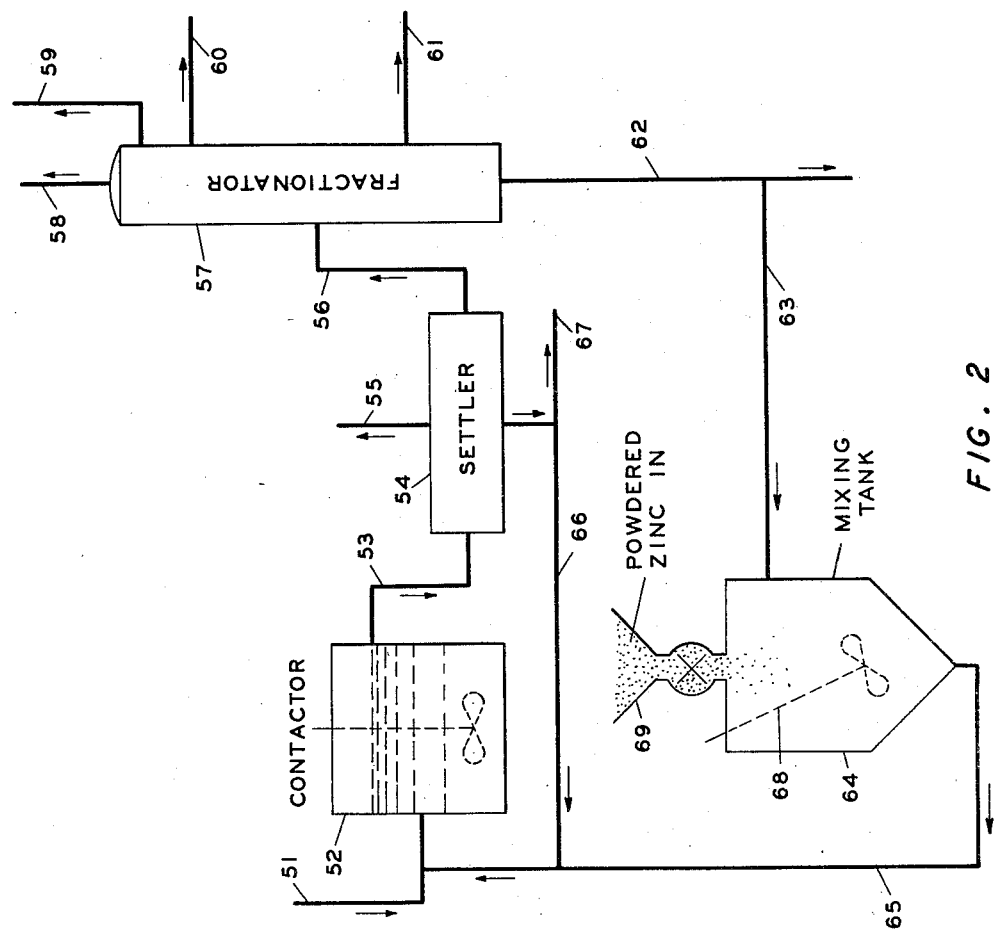

Figure 2 represents diagrammatically another form of apparatus in which a second embodiment of my invention may be carried out.

The present invention provides a dehydrofluorination process in which improved contacting of the hydrocarbon with the catalyst is obtainable and in which increased space velocities may be used. In accordance with one embodiment of my invention, hydrocarbons are contacted in the vapor phase, with a fluidized metallic dehydrofluorination catalyst having a relatively high surface area per unit of weight, and with a fluidized hydrogen fluoride adsorbent at temperaures and pressures suitable for dehydrofluorination. The adsorbent is subsequently heated at an increased temperature, preferably in the presence of a carrier gas to desorb the hydrogen fluoride, which may be recovered.

Another embodiment of my invention provides for a method of dehydrofluorination with improved contacting in the presence of a metal catalyst also having a relatively high surface area per unit of weight. In this embodiment, the finely divided metal catalyst is added to the liquid hydrocarbon to be treated in the form of a slurry and this mixture then subjected to dehydrofluorination conditions. The metal catalyst is then settled, withdrawn from the settler and recycled. The liberated hydrogen fluoride may then be removed by distillation for cyclic use in a prior step of the process or for such other disposal as desired.

By organically combined fluorine, I include the type of compounds ordinarily called organic fluorides, such as, for example, ethyl fluoride, propyl fluoride, either normal or iso, butyl fluoride, either normal, secondary, or iso. Such compounds are formed, to a small extent, in such catalytic processes as hydrogen fluoride alkylation, isomerization, or other processes in which a fluoride catalyst is contacted with hydrocarbon compounds.

By the term "dehydrofluorination" is meant the splitting off of hydrogen fluoride from a fluorine containing compound, such as butyl fluoride, propyl fluoride, etc. It is believed that when HF splits off from butyl fluoride ($C_4H_9F$), a butene ($C_4H_8$) is produced. Although one embodiment is herein described in connection with a hydrocarbon isomerization catalyzed by hydrofluoric acid and boron fluoride, it may also be practiced in conjunction with other fluoride-catalyzed conversions, such as hydrofluoric acid alkylation and the like.

In some instances, particularly when relatively high-boiling materials are present in the products of a fluoride-catalyzed conversion, it may be desirable to treat only the lower-boiling fractions of the hydrocarbon product by the process of this invention, since in some cases, cost of the organic fluorine is concentrated in these fractions.

Referring to the drawing and especially to Figure 1, which is a schematic flow diagram of one embodiment of my invention, normal pentane and a catalyst, comprising about 97 per cent hydrofluoric acid and 3 per cent by weight of boron fluoride, enter a reactor 14 through inlets 12 and 13, respectively. In reactor 14, which is maintained at about 100° F. and under sufficient pressure to maintain substantially all the contents in the liquid phase, the normal pentane is intimately contacted with the catalyst and converted to isopentane, butanes, and hexanes. The reactor effluent is passed through a conduit 15 into a settler 16, in which the mixture separates into a heavy acid phase and a lighter hydrocarbon phase. Most of the acid phase is recycled through a conduit 18 to the reactor 14; the remainder is withdrawn through an outlet 17 and passed to regeneration means, not shown. The hydrocarbon phase from the settler 16 is passed through a conduit 19 to an azeotropic distillation column 20. From this distillation column, an overhead fraction comprising a minimum-boiling azeotropic mixture of isobutane and hydrofluoric acid is withdrawn through a conduit 21, condensed in a condenser 49 and passed to an accumulator 22, in which it separates into an acid phase and a hydrocarbon phase. The acid phase is recycled through a conduit 24 to the settler 16 and the hydrocarbon phase is returned to the column 20 as reflux through a conduit 23. A substantially acid-free kettle product is passed through a conduit 25 to a heater 26 in which the bottoms product is vaporized. The vaporized hydrocarbon mixture then is passed through a conduit 25A to a treater 28.

The treater 28 comprises two sections, an upper or cylindrical section and a lower or conical section. The lower or conical section contains metal (e. g. zinc) catalyst 38 is substantially dust or finely divided form, and the upper cylindrical portion of the treater contains finely divided activated carbon 39. Since the linear velocities of the hydrocarbon material in the conical section of the treater is greater than in the cylindrical section and since the density of the activated carbon is considerably lower than that of the zinc dust, the activated carbon concentrates in the upper section of the treater and, accordingly, the zinc dust concentrates in the lower section. The velocities of the hydrocarbon gases passing through the treater 28 and the particle size of the metal dust and of the activated carbon are so interrelated that the described concentration occurs and that these two solid materials are maintained in a state of fluidization or hindered settling in the hydrocarbon material passing through the treater. It is intended that little or no solid material is carried out of the treater 28 by the hydrocarbon material. If, however, any solid material is carried out, it may be separated by conventional means and returned to the treater through connecting pipes, etc., not shown. When charging the treater 28 or when adding fresh catalyst and adsorbent during operation, these materials may be added through a valved inlet line 40. A carrier gas also passes through the line 40 in sufficient velocity to carry the catalyst and adsorbent through the pipe 40 through a pipe 25A into the conical section of the treater 28. As additional solid materials are added through line 40 and passed into the treater 28, the depth of the solid beds increases until the desired amount of the catalyst and adsorbent have been added. During operation, used adsorbent may be withdrawn from the treater 28 through a line 41 and passed into a regenerator 45. In this regenerator, the adsorbent may be heated to strip off the adsorbed material, which, in this case, will be hydrogen fluoride, and this material may pass through line 50 into a condenser 33. Adsorbent freed of its adsorbed material in regenerator 45 passes through a line 46 into the line 40 for recycling into the treater vessel 28.

In like manner, used finely divided metal may be withdrawn from the treater 28 through a pipe 42 and passed into a regenerator means 48 in which the metal may be revivified by any means desired. The revivified metal is then passed through a conduit 47 into the conduit 40 to be readded to the main bulk of metal catalyst in the treater 28. Any hydrocarbon material withdrawn through the outlets 41 and 42 may be recovered in conjunction with the regenerator means 45 and 48, if desired.

The above-described concentration of the finely divided zinc in the lower portion of the treater 28 and of the activated carbon in the upper section of the treater 28 constitute a particularly advantageous feature of the present invention. The finely divided zinc catalyzes the dehydrofluorination reaction in the lower section of the treater 28, and the hydrogen fluoride so liberated is adsorbed by the activated carbon in the upper section of the treater 28. The dehydrofluorination and the hydrogen fluoride adsorption are thus accomplished in a single treater and without the necessity for previously arranged alternate fixed beds of catalyst and adsorbent. An additional advantage of this treater 28 is that its capacity is much greater for a given size of vessel than that of the static, fixed-bed type of apparatus. The defluorinated hydrocarbon material is withdrawn from the treater 28 through a conduit 29. A portion of the material in conduit 29 may be recycled to the treater 28 through a conduit 50A, if desired. Substantially fluorine-free hydrocarbon material is withdrawn from the system through an outlet line 30 and is passed to a fractionation means, not shown, for recovery of desired hydrocarbons or hydrocarbon fractions.

In one modification, when the activated carbon 39 has become saturated with the hydrogen fluoride, the valves 27 and 31 in conduits 25A and 30, respectively, are closed and the vaporized hydrocarbon material may be passed to a stand-by treater, not shown, but similar to the treater 28. Valves 37 and 32, previously closed, in inlet 36 and conduit 29, respectively, are then opened. A hot carrier gas introduced through the inlet 36 passes through the finely divided zinc 38 and finally contacts the activated carbon 39 to desorb and carry away the hydrogen fluoride. The carrier gas containing the hydrogen fluoride is passed through the conduit 29 to the condenser 33 for condensation of the hydrogen fluoride. The carrier gas itself may be withdrawn from the system through an outlet 34, and the condensed hydrogen fluoride is passed through a conduit 35 to reactor 14.

Light hydrocarbons and/or other inert gases, such as nitrogen or hydrogen, may be used as the carrier gas. A preferred carrier gas is a part of the normal pentane feed to the reactor 14. When normal pentane is so used, the partial condenser 33 may be modified or eliminated and the pentane-hydrogen fluoride mixture effluent from treater 28 may be totally condensed and passed directly to the reactor 14.

When such a stand-by treater is used in conjunction with the treater 28, the regenerators 45 and 48 need not be used. However, I prefer to use regenerators such as those illustrated diagrammatically as regenerators 45 and 48 and save the cost of construction of a double treater vessel. It will be understood that treater 28 and regenerators 45 and 48 are illustrated diagrammatically and that means for removal and return of the carbon and the zinc are not described in detail, since such means are known in the art.

In this preferred embodiment, the dehydrofluorination and hydrogen fluoride adsorption are conducted in a single treater vessel. A suitable temperature range for the dehydrofluorination and for the activated carbon is from about 150° to 350° F. The pressure is not critical, although in general, extremely high pressures disfavor the hydrofluorination reaction and favor adsorption. Pressures from atmospheric up to 100 pounds per square inch, or even more, may be used. The space velocities of the hydrocarbon vapors passing through treater 28 may be of the order of 1000 to 3000 gaseous volumes of hydrocarbon per volume of catalyst plus adsorbent per hour. The optimum space velocities for any particular application, however, will depend upon such factors as the particular catalyst used, the particular adsorbent used, the particle size of these materials, and the design of the treater and should probably best be determined by trial. Fluid-bed or hindered settling conditions in treater 28 are preferred. The treater may, however, be operated at such conditions that the adsorbent is carried through the treater in suspension in the hydrocarbon, separated from the hydrocarbon stream, and recycled to the treater.

The desorption of the hydrogen fluoride from the enriched adsorbent may be carried out in either the regenerator vessel 45 or in the main treater vessel 28 at temperatures ranging from about 350 to 500° F. Desorption in either case, of course, is promoted by the use of carrier gas. Atmospheric pressure is suitable for desorption although higher pressures may be used, if desired. Desorption is, of course, favored by relatively low pressure. Fluidizing space velocities may be used during the desorption. Lower pressure, however, may also be used.

As dehydrofluorination catalysts, I prefer metals of about 40 to 250 mesh size. Examples of such metals that are suitable and commercially available are zinc dust, magnesium powder, and copper and aluminum bronze powders, of the type used in certain paints. It is advantageous, in some cases, to employ a mixture of two or more of these materials. Commercial metals frequently contain other metals in smaller amounts as impurities, and such a metal with metallic impurities is desirable as a catalyst for this process; for example, commercial zinc dust may contain appreciable quantities of lead, copper, or cadmium. Such a zinc catalyst may be prepared from low-grade spelter. Another useful type of finely divided catalyst consists of metals in the sponge form.

Preferred adsorbent or absorbent materials for use in the upper section of the treater 28 are finely divided alkali-metal fluorides, cupric sulfate, cuprous chloride, and activated carbon. The last-mentioned material is preferred in the process of the present invention.

*Example I*

Normal pentane is contacted with a catalyst consisting of about 97 weight per cent hydrofluoric acid and 3 weight per cent boron fluoride for about 6 minutes at 118° F. The hydrocarbon product of this reaction, after being freed of the catalyst, has approximately the following composition:

| | | |
|---|---|---|
| Propane | mol per cent | 3.2 |
| Isobutane | do | 42.0 |
| Normal butane | do | 11.5 |
| Isopentane | do | 19.6 |
| Normal pentane | do | 5.5 |
| Isohexanes | do | 12.7 |
| Heavier | do | 5.5 |
| Organic F | weight, per cent | 0.002 |

This hydrocarbon product is substantially completely vaporized and is contacted at 250° F. and atmospheric pressure with 200-mesh zinc dust and 60-mesh activated carbon under fluidizing conditions in a treater similar to treater 28 of Figure 1. The hydrocarbon mixture to be treated is substantially acid-free. After the dehydrofluorination has continued for several hours, small amounts of hydrofluoric acid are detected in the treated hydrocarbon material. Dehydrofluorination is then discontinued and the carbon-zinc dust mixture is treated with normal butane at 500° F. until the effluent butane contains substantially no acid. Approximately 60 per cent of the organic fluorine removed from the treated hydrocarbon mixture is recovered from the butane as hydrofluoric acid.

Additional modifications of the embodiment of Figure 1 of my invention will be apparent to those skilled in the art; for example, treater 28 may have the form of an inverted cone, or may comprise two connected cylindrical segments, the upper of which has a substantially greater diameter than the lower. Furthermore, part of the heat added to the hydrocarbon material in conduit 25 may be supplied by indirect heat exchange with adsorbent and dehydrofluorination catalyst immediately after the desorption step or with the effluent carrier gas from the desorption step.

Figure 2 represents a second embodiment of my invention and in this embodiment, the finely divided metal dust is added to a hydrocarbon liquid to form a slurry and this slurry is then added to the main quantity of hydrocarbon liquid containing organically combined fluorine. Referring to Figure 2, in a contactor 52, the acid-free hydrocarbon material to be freed from organically combined fluorine is intimately mixed with a slurry of finely divided zinc in liquid hydrocarbons. After a suitable reaction period under dehydrofluorination conditions, previously described, the mixture from the mixer 52 is passed through a conduit 53 to a settler 54 in which the finely divided zinc is allowed to settle. The zinc and a small amount of hydrocarbon is withdrawn from the settler 54 as a slurry and is passed through lines 66, 65 and 51 into the original contactor 52. A portion of this slurry, however, may be withdrawn through an outlet 67 for recovery of the hydrocarbons and discarding of the zinc or for revivification of the zinc in means not shown. The settler 54 is maintained at such temperature and pressure that substantially all the hydrofluoric acid liberated in the contactor 52 is flashed off as a minimum-boiling azeotropic mixture with isobutane and/or propane. The flashed acid-hydrocarbon mixture is passed through a conduit 55 to such disposal as desired. In case the liquid-solid contacting embodiment of Figure 2 is used to replace the vapor-solid contacting embodiment of Figure 1, the flashed azeotrope from conduit 55 is then passed through condenser 49 of Figure 1 and the condensate accumulates in the separator 22. The liquid hydrocarbon material to be treated in conduit 51, in this case, may originate as the bottoms product in the azeotropic distillation column 20 of Figure 1, and pipe 25 of Figure 1 would then be connected with pipe 51 of Figure 2.

From the settler 54, a substantially fluorine-free hydrocarbon mixture is passed through a conduit 56 into a fractionator 57. The following fractions may be obtained from this fractionator 57, if desired: (1) a light hydrocarbon fraction, comprising chiefly propane, withdrawn through outlet 58; (2) an isobutane fraction, withdrawn through outlet 59 for such disposal as desired; (3) a normal butane fraction, withdrawn through outlet 60; (4) a gasoline boiling range fraction, withdrawn as the main product of the process through outlet 61; and (5) a heavier fraction, withdrawn through outlet 62.

At least a portion of the heavier fraction is passed through conduit 63 to mixing tank 64, which is provided with a hopper 69 and a suitable mixing means, such as the mechanical stirrer 68. Finely divided zinc, about 200-mesh, is added through the hopper 69 to the heavier hydrocarbon fraction with which the zinc is mixed to form a slurry. Other liquid hydrocarbon may be added to the mixing tank 64 in case insufficient heavy hydrocarbon is available from fractionator 57 for making a slurry of the proper consistency. The slurry is passed through a conduit 65 to conduit 51 to the contactor 52 for the dehydrofluorination treatment previously described. The slurry may be preheated to a dehydrofluorination temperature by means not shown. The slurry formation is, however, preferably conducted at about atmospheric temperature and pressure and the slurry heated just prior to contacting the organic fluorine-containing liquid in conduit 51.

For use with the type of contactor illustrated in the embodiment of Figure 2, a preferred dehydrofluorination catalyst comprises metals in the form of powders or dust of about 60- to 250-mesh size. Commercial zinc dust is a suitable and readily available catalyst. Powdered aluminum, such as the so-called "aluminum bronze," as used in paints, is also suitable. The mixture of two or more powdered metals as a polymetallic dust, such as zinc dust containing appreciable portions of copper or cadmium as impurities is suitable and, in some cases, may be preferred.

A particularly effective catalyst may be prepared as follows: To an acidic aqueous solution of metallic salts, such as cadmium, lead, and copper chlorides, is added an excess of a more electropositive metal in finely divided form, e. g. commercial zinc dust, to precipitate substantially all of the cadmium, copper, and lead in the so-called sponge form. The pH of the solution is preferably maintained at about 2 to 4 during the precipitation. The precipitate is separated from the solution, washed, and dried in a non-oxidizing atmosphere. The dried precipitate is then ground to about 60 to 200 mesh size, also in a nonoxidizing atmosphere.

Other specific arrangements within the scope of the invention may be provided by those skilled in the art; for example, any other or all of the fractions obtained in the fractionator 57 may be treated individually with the metal slurry in place of treating the feed stream to the fractionator. In other cases, when equipment capacity is limited, it may be preferable to dehydroflourinate only the normally liquid fraction of the hydrocarbon product, and in such as case, it may be desirable to add a small amount of light hydrocarbon to the metal-treated hydrocarbon to aid in volatilizing the hydrofluoric acid from the settler 54. Furthermore, contactor 52 may be so constructed and operated that the hydrogen fluoride is flashed off within the contactor as soon as liberated.

*Example II*

The acid-free hydrocarbon effluent from an HF alkylation system in which isobutane is alkylated with butenes contains about 0.03 weight per cent organic fluorine. To this effluent is added a slurry made by mixing commercial zinc dust with heavy alkylate (I. B. P. 375 F.) obtained by fractionating the alkylation product. The zinc dust contains 95 per cent metallic zinc, 0.2 per cent lead, 0.15 per cent cadmium, and a trace of copper; 98 per cent is sufficiently fine to pass through a 225-mesh screen. The mixture of alkylation effluent and slurry (zinc content of total mixture, 40 weight per cent) is thoroughly agitated for 20 minutes at 250 F. and 400 p. s. i. by means of a motor-driven stirrer. The liberated hydrofluoric acid is flashed from the mixture, and the zinc dust is removed by settling and decantation. The recovered hydrocarbon mixture has an organic fluorine content of about 0.01 weight per cent.

*Example III*

Example II is repeated, a mixture of equal parts by weight of 80-mesh aluminum and copper powders being substituted for zinc dust, and the contact time being increase to 30 minutes. The recovered hydrocarbon effluent has an organic fluorine content of about 0.007 weight per cent.

Example IV

Example II is repeated as a continuous operation, with the additional step of recycling about 30 volume per cent of the zinc-treated alkylation effluent to the dehydrofluorination step, the recycled material containing, in suspension, substantially all the settled zinc dust. After establishment of constant operating conditions, the hydrocarbon mixture withdrawn from the system contains substantially less organic fluorine than those previously treated.

I claim:

1. A method for catalytically treating a saturated hydrocarbon material containing saturated fluorine containing organic compounds as impurity for the removal of said impurity comprising maintaining a body of at least one finely divided metal catalyst selected from the group of metals consisting of zinc, magnesium, cadmium, copper, lead and aluminum, in a fluidized condition in a treating zone at a temperature between the limits of 150° F. and 350° F., passing said saturated hydrocarbon material containing said impurity in a vaporous condition at a temperature between the limits of 150° F. and 350° F. into said body of fluidized metal catalyst in said zone to decompose the organic fluorine compounds and liberate hydrogen fluoride, immediately separating the liberated hydrogen fluoride from the hydrocarbon vapors by passing the effluent vapors from the fluidized metal catalyst through a fluidized body of activated carbon in said zone above and in contact with said metal catalyst, and removing treated hydrocarbon material from the body of activated carbon in said zone as the product of the process.

2. The method of claim 1 wherein the space velocity of the vaporous hydrocarbon material containing said impurity passed into the body of fluidized metal in said zone is maintained between the limits of 1000 and 3000 gaseous volumes of hydrocarbon per volume of finely divided metal and adsorbent per hour.

3. A method for catalytically treating a saturated hydrocarbon material containing saturated fluorine containing organic compounds as impurity for the removal of said impurity comprising maintaining a body of finely divided zinc catalyst in a fluidized condition in a treating zone at a temperature between the limits of 150° F. and 350° F., passing said saturated hydrocarbon material containing said impurity in a vaporous condition at a temperature between the limits of 150° and 350° F. into said body of fluidized zinc catalyst in said zone to decompose the organic fluorine compounds and liberate hydrogen fluoride, immediately separating the liberated hydrogen fluoride from the hydrocarbon vapors by passing the effluent vapors from the fluidized zinc catalyst through a fluidized body of activated carbon in said zone above and in contact with said zinc catalyst, and removing treated hydrocarbon material from the body of activated carbon in said zone as the product of the process.

4. The method of claim 3 wherein the finely divided zinc is 40 mesh and finer in size and the space velocity of the vaporous hydrocarbon material containing said impurity passed into the body of fluidized metal in said zone is maintained between the limits of 1000 and 3000 gaseous volumes of hydrocarbon per volume of finely divided zinc and adsorbent per hour.

5. The method of claim 4 wherein a continuous stream of fluidized activated carbon is removed from said body of fluidized activated carbon in said zone and heated to a temperature within the limits of 350° F. and 500° F. to desorb hydrogen fluoride therefrom and to reactivate the carbon, the desorbed reactivated carbon is recycled to the body of activated carbon in said zone, a stream of used finely divided zinc is continuously removed, and such a quantity of fresh finely divided zinc as to replace that removed is continuously added to the fluidized body of finely divided zinc.

6. The method of claim 1 wherein the finely divided metal is in the sponge form.

7. A method for catalytically treating a saturated hydrocarbon material containing saturated fluorine containing organic compounds as impurity for the removal of said impurity comprising maintaining a body of finely divided magnesium catalyst in a fluidized condition in a treating zone at a temperature between the limits of 150° F. and 350° F., passing said saturated hydrocarbon material containing said impurity in a vaporous condition at a temperature between the limits of 150° and 350° F. into said body of fluidized magnesium catalyst in said zone to decompose the organic fluorine compounds and liberate hydrogen fluoride, immediate separating the liberated hydrogen fluoride from the hydrocarbon vapors by passing the effluent vapors from the fluidized magnesium catalyst through a fluidized body of activated carbon in said zone above and in contact with said magnesium catalyst, and removing treated hydrocarbon material from the body of activated carbon in said zone as the product of the process.

8. A method for catalytically treating a saturated hydrocarbon material containing saturated fluorine containing organic compounds as impurity for the removal of said impurity comprising maintaining a body of finely divided copper catalyst in a fluidized condition in a treating zone at a temperature between the limits of 150° F. and 350° F., passing said saturated hydrocarbon material containing said impurity in a vaporous condition at a temperature between the limits of 150° and 350° F. into said body of fluidized copper catalyst in said zone to decompose the organic fluorine compounds and liberate hydrogen fluoride, immediately separating the liberated hydrogen fluoride from the hydrocarbon vapors by passing the effluent vapors from the fluidized copper catalyst through a fluidized body of activated carbon in said zone above and in contact with said copper catalyst, and removing treated hydrocarbon material from the body of activated carbon in said zone as the product of the process.

9. A method for catalytically treating a saturated hydrocarbon material containing saturated fluorine containing organic compounds as impurity for the removal of said impurity comprising maintaining a body of finely divided lead catalyst in a fluidized condition in a treating zone at a temperature between the limits of 150° F. and 350° F., passing said saturated hydrocarbon material containing said impurity in a vaporous condition at a temperature between the limits of 150° and 350° F. into said body of fluidized lead catalyst in said zone to decompose the organic fluorine compounds and liberate hydrogen fluoride, immediately separating the liberated hydrogen fluoride from the hydrocarbon vapors by passing the effluent vapors from the fluidized lead catalyst through a fluidized body of activated carbon in said zone above and in contact with said lead catalyst, and removing treated hydrocarbon material from the body of activated carbon in said zone as the product of the process.

10. A method for catalytically treated a saturated hydrocarbon material containing saturated fluorine containing organic compounds as impurity for the removal of said impurity comprising maintaining a body of finely divided aluminum catalyst in a fluidized condition in a treating zone at a temperature between the limits of 150° F. and 350° F., passing said saturated hydrocarbon material containing said impurity in a vaporous condition at a temperature between the limits of 150° and 350° F. into said body of fluidized aluminum catalyst in said zone to decompose the organic fluorine compounds and liberate hydrogen fluoride, immediately separating the liberated hydrogen fluoride from the hydrocarbon vapors by passing the effluent vapors from the fluidized aluminum catalyst through a fluidized body of activated carbon in said zone above and in contact with said aluminum catalyst, and removing treated hydrocarbon material from the body of activated carbon in said zone as the product of the process.

GEORGE N. CADE.

REFERENCES CITED

The following references are of record in the file of this patent:

UNITED STATES PATENTS

| Number | Name | Date |
|---|---|---|
| 1,801,213 | Teplitz | Apr. 14, 1931 |
| 1,869,781 | Shiffler | Aug. 2, 1932 |
| 1,884,002 | Leyes | Oct. 25, 1932 |
| 2,322,800 | Frey | June 29, 1943 |
| 2,333,648 | Grosse | Nov. 9, 1943 |
| 2,333,649 | Grosse | Nov. 9, 1943 |
| 2,341,567 | Moriarty | Feb. 15, 1944 |
| 2,347,945 | Frey | May 2, 1944 |
| 2,379,697 | Evans | July 3, 1945 |
| 2,379,708 | Hearne | July 3, 1945 |
| 2,387,723 | Dreyfus | Oct. 30, 1945 |
| 2,409,690 | Nicholson | Oct. 22, 1946 |
| 2,481,207 | Eberle | Sept. 6, 1949 |
| 2,481,208 | Eberle | Sept. 6, 1949 |